(12) United States Patent
Tsu

(10) Patent No.: US 7,705,850 B1
(45) Date of Patent: Apr. 27, 2010

(54) COMPUTER SYSTEM HAVING INCREASED PCIE BANDWIDTH

(75) Inventor: William P. Tsu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 494 days.

(21) Appl. No.: 11/270,200

(22) Filed: Nov. 8, 2005

(51) Int. Cl.
G06F 15/00 (2006.01)
G06F 3/00 (2006.01)

(52) U.S. Cl. .......................... 345/501; 345/502; 710/1; 710/100; 710/22; 710/28; 710/36; 710/305; 710/313

(58) Field of Classification Search ................ 710/36, 710/1, 100, 22, 28, 305, 313; 345/502, 501
See application file for complete search history.

(56) References Cited

U.S. PATENT DOCUMENTS

| | | | | |
|---|---|---|---|---|
| 5,394,515 | A * | 2/1995 | Lentz et al. | 358/1.16 |
| 6,148,357 | A * | 11/2000 | Gulick et al. | 710/309 |
| 7,222,199 | B2 * | 5/2007 | Jolly et al. | 710/60 |
| 2004/0193757 | A1 * | 9/2004 | Creta et al. | 710/33 |
| 2004/0210678 | A1 * | 10/2004 | Pettey et al. | 710/1 |
| 2005/0088445 | A1 * | 4/2005 | Gonzalez et al. | 345/502 |
| 2005/0132118 | A1 * | 6/2005 | Chen et al. | 710/315 |
| 2005/0134593 | A1 * | 6/2005 | Janus et al. | 345/520 |
| 2006/0098016 | A1 * | 5/2006 | Chou et al. | 345/501 |
| 2006/0190663 | A1 * | 8/2006 | Lu | 710/312 |
| 2006/0232590 | A1 * | 10/2006 | Bakalash et al. | 345/502 |
| 2007/0294454 | A1 * | 12/2007 | Danilak | 710/305 |

OTHER PUBLICATIONS

'Multiple Graphics Technology' by Tim Smalley, from www.bit-tech.net, Jun. 30, 2004.*
'nForce 4, Athlon 64 4000/FX-55, and the Industry. A Little Bit of Everything' by Josh Walrath, from www.penstarsys.com, Oct. 21, 2004.*
'Intel E7525 Chipset Product Brief' by Intel Corporation, 2004.*
'Microsoft Discloses XBOX 360 Architecture' by CDRinfo, Aug. 26, 2005.*
'Motherboards & Core-Logic Chipsets: The Deep Stuff' by George Jones, Maximum PC 2005 Buyer's Guide, Oct. 22, 2004.*

* cited by examiner

*Primary Examiner*—Henry W. H. Tsai
*Assistant Examiner*—Steven G Snyder
(74) *Attorney, Agent, or Firm*—Patterson & Sheridan, LLP

(57) ABSTRACT

In a computer system employing PCI Express (PCIe) links, the PCIe bandwidth is increased by configuring an endpoint device with at least two PCIe interfaces, and coupling the first of these interfaces with a PCIe interface of a system controller and the second of these PCIe interfaces with an expansion PCIe interface of an I/O controller. Therefore, the endpoint device's performance becomes more efficient. For example, if the endpoint device is a graphics processing unit, then the endpoint device can execute more frames per second. When a read request is split up and issued as multiple read requests over the at least two PCIe interfaces, the multiple read completion packets that are received in response thereto are ordered in accordance with the timing of the multiple read requests.

20 Claims, 6 Drawing Sheets

COMPUTER SYSTEM HAVING INCREASED PCIE BANDWIDTH

BACKGROUND OF THE INVENTION

1. Field of the Invention

The invention generally relates to communication in computer systems. More specifically the invention relates to a system having increased Peripheral Component Interconnect Express (PCIe) bandwidth.

2. Description of the Related Art

In some computer systems, a chipset communicates with one or more endpoint devices through a PCIe link. FIG. 1 is a block diagram showing a prior art computer system 100 employing PCIe links. Computer system 100 includes endpoint device 102, chipset 104, central processing unit (CPU) 106, and system memory 108. Further, chipset 104 includes a system controller 110 (e.g., a controller commonly known as northbridge) and an I/O controller 112 (e.g., a controller commonly known as southbridge). System controller 110 communicates with CPU 106, system memory 108, I/O controller 112, and endpoint device 102, which may be a graphics processing unit (GPU). I/O controller 112 communicates with system controller 110 and one or more I/O devices (not shown).

System controller 110 includes PCIe interface 114 that is used to communicate with endpoint device 102, and endpoint device 102 includes a PCIe interface 116 that is used to communicate with system controller 110. PCIe interface 114 and PCIe interface 116 are connected to each other through a PCIe link, i.e., a plurality of PCIe lanes, typically 16. Endpoint device 102 communicates with CPU 106 and system memory 108 through system controller 110. Endpoint device 102 communicates with I/O devices connected to I/O controller 112 through system controller 110 and I/O controller 112. I/O controller 112 includes a plurality of expansion PCIe interfaces that are used for communication with I/O devices. Three of the expansion PCIe interfaces of I/O controller 112 are shown in FIG. 1. They are PCIe interface 118, PCIe interface 120, and PCIe interface 122.

In the prior art computer system 100 described above, the PCIe bandwidth available to endpoint device 102 is limited. For graphics applications that employ turbo cache technology, where part of the frame buffer resides in system memory 108, PCIe bandwidth available to endpoint device 102 is becoming the bottleneck. Optimizing the bus utilization of the PCIe link can increase the PCIe bus throughput efficiency, but the efficiency can be increased only up to a certain limit.

There is therefore, a need for a system that can increase the PCIe bandwidth available to a PCIe endpoint device.

SUMMARY OF THE INVENTION

An aspect of the invention is to provide a computer system that increases the PCIe bandwidth available to an endpoint device. Another aspect of the invention is to provide an endpoint device for a computer system that is configured to use the increased PCIe bandwidth. Still another aspect of the invention is to provide a method of communication in a computer system that increases the PCIe bandwidth available to an endpoint device.

According to an embodiment of the invention, a computer system includes first and second controllers and an endpoint device that is connected to the first and second controllers respectively through first and second PCIe links. The endpoint device has a pair of PCIe interfaces, one of which provides the connection to the first PCIe link and the other of which provides the connection to the second PCIe link. Further, the first controller includes a PCIe interface that provides the connection to the first PCIe link, and the second controller includes a PCIe interface that provides the connection to the second PCIe link. With this configuration, the PCIe bandwidth available to the endpoint device is increased in proportion to the amount of PCIe lanes that are provided with the second PCIe link.

According to another embodiment of the invention, a method for communicating between the endpoint device and the first and second controllers includes the steps of sending a first read request to the first controller over a first PCIe link and a second read request to the second controller over a second PCIe link, and receiving read completion packets in response to the first read request and the second read request. When a read request is split up and issued as multiple read requests over multiple PCIe links, the multiple read completion packets that are received in response thereto are ordered in accordance with the timing of the multiple read requests.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION

Various embodiments of the invention provide methods and systems for communication in a computer system that employs PCI Express (PCIe) links. The PCI Express Base Specification, Version 1.0a dated Apr. 15, 2003 and Revision 1.1 dated Mar. 28, 2005, which provides a detailed description of the PCIe standard, is incorporated by reference herein.

Figure 1:
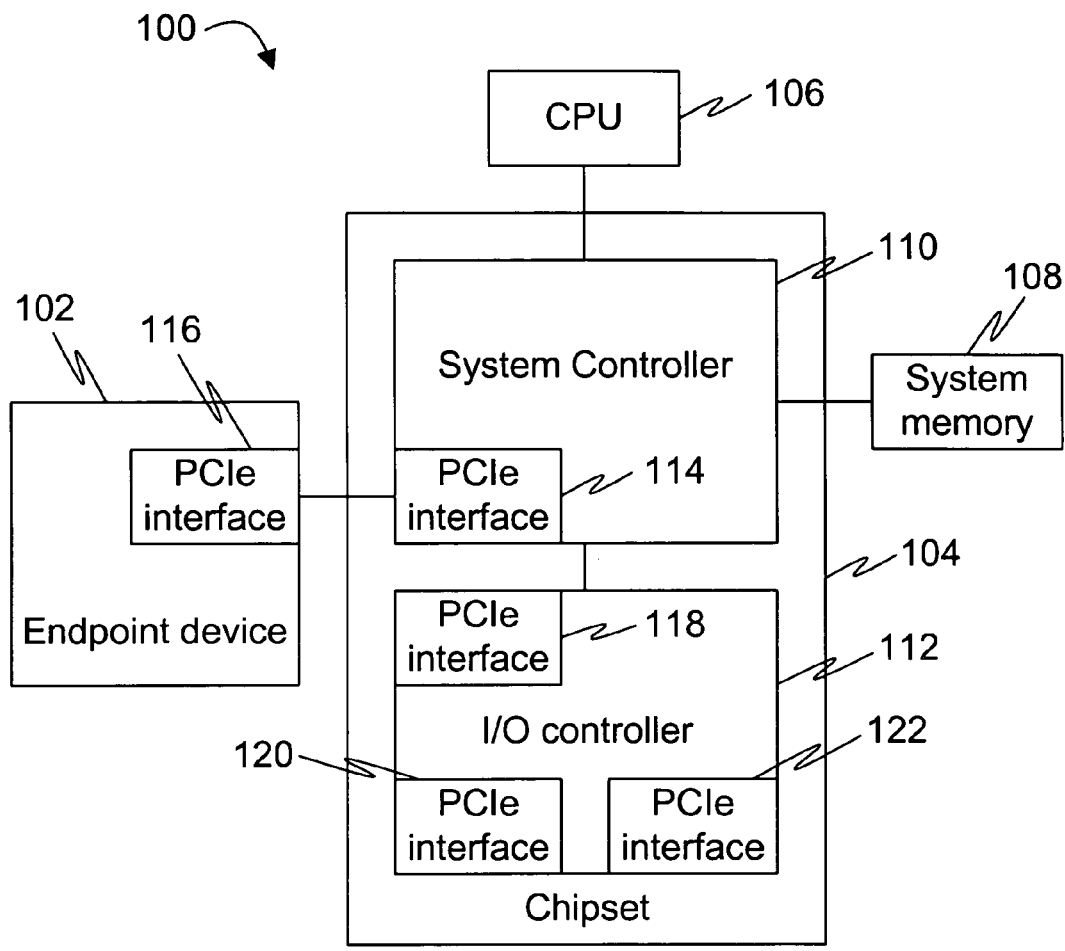
FIG. 1 is a block diagram of a prior art computer system.
Figure 2:
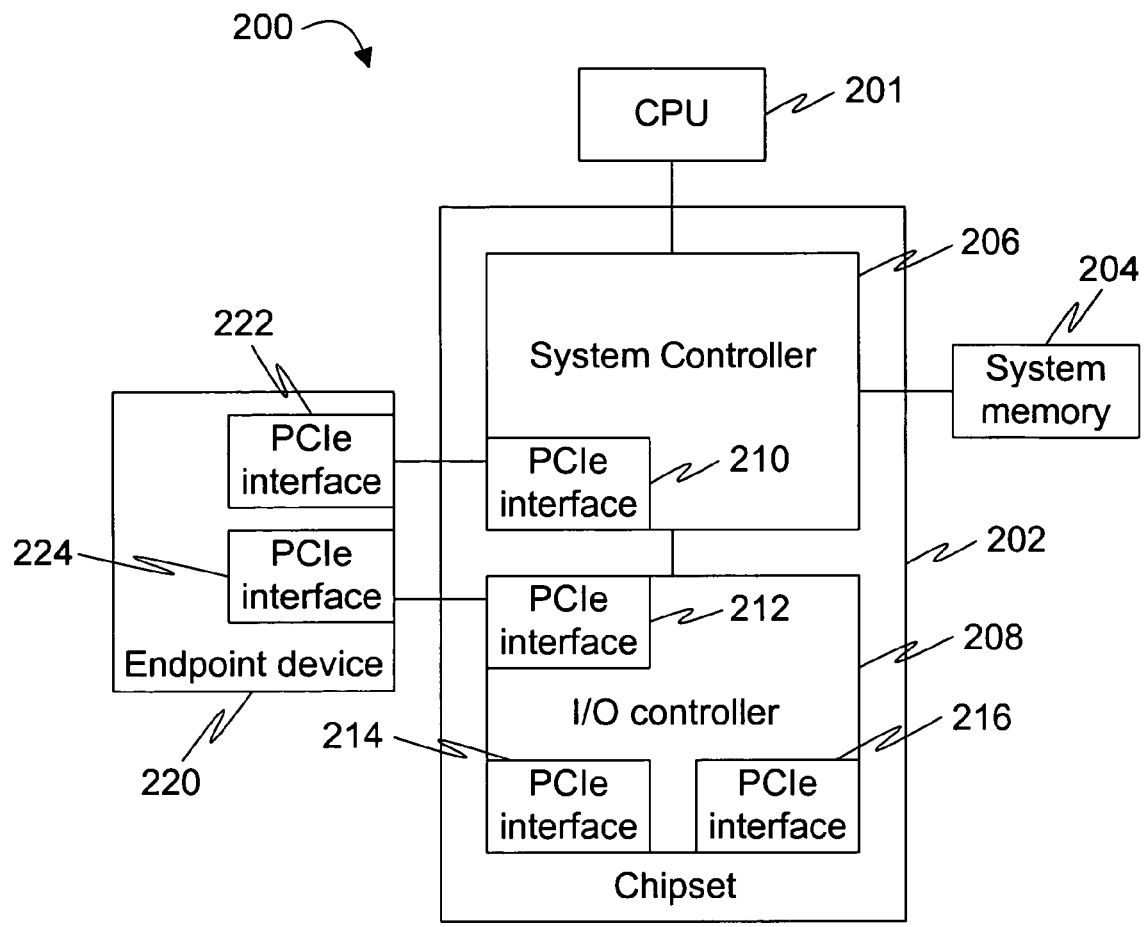
FIG. 2 is a simplified block diagram of a computer system according to an embodiment of the invention.

FIG. 2 is a simplified block diagram showing a computer system 200 that employs PCIe links, in accordance with an embodiment of the invention. Computer system 200 includes CPU 201, chipset 202, system memory 204, and endpoint device 220. One example of endpoint device 220 is a GPU. Further, chipset 202 includes a system controller 206, e.g., a northbridge controller, and I/O controller 208, e.g., a southbridge controller.

System controller 206 communicates with endpoint device 220 through PCIe interface 210. PCIe interface 210 is directly connected to PCIe interface 222 of endpoint device 220 through a PCIe link. In the embodiment of the invention illustrated herein, the PCIe link is a 16-lane PCIe link, and PCIe interface 210 and PCIe interface 222 are 16-lane PCIe interfaces. I/O controller 208 communicates with endpoint device 220 through PCIe interface 212, which is one of the expansion PCIe interfaces of I/O controller 208. The expansion PCIe interfaces of I/O controller 208 (illustrated in FIG. 2 as PCIe interfaces 212, 214, 216) can be used, for example, for Fibre Channel, InfiniBand and Gigabit Ethernet connections. The expansion PCIe interfaces are typically available as 8-lane, 4-lane or 1-lane PCIe interfaces. PCIe interface 224 is configured to match the number of lanes provided in the PCIe interface 212. In the embodiment of the invention illustrated herein, PCIe interface 212 and PCIe interface 224 are 4-lane PCIe interfaces.

In the computer system illustrated in FIG. 2, when endpoint device 220 issues a request to read from a memory location in system memory 204, it may send the request in the form of a read request PCIe packet to system controller 206 through PCIe interface 222. It may also send the request in the form of a read request PCIe packet initially to I/O controller 208 through PCIe interface 224, and I/O controller 208 routes the packet to system controller 206.

Figure 3:
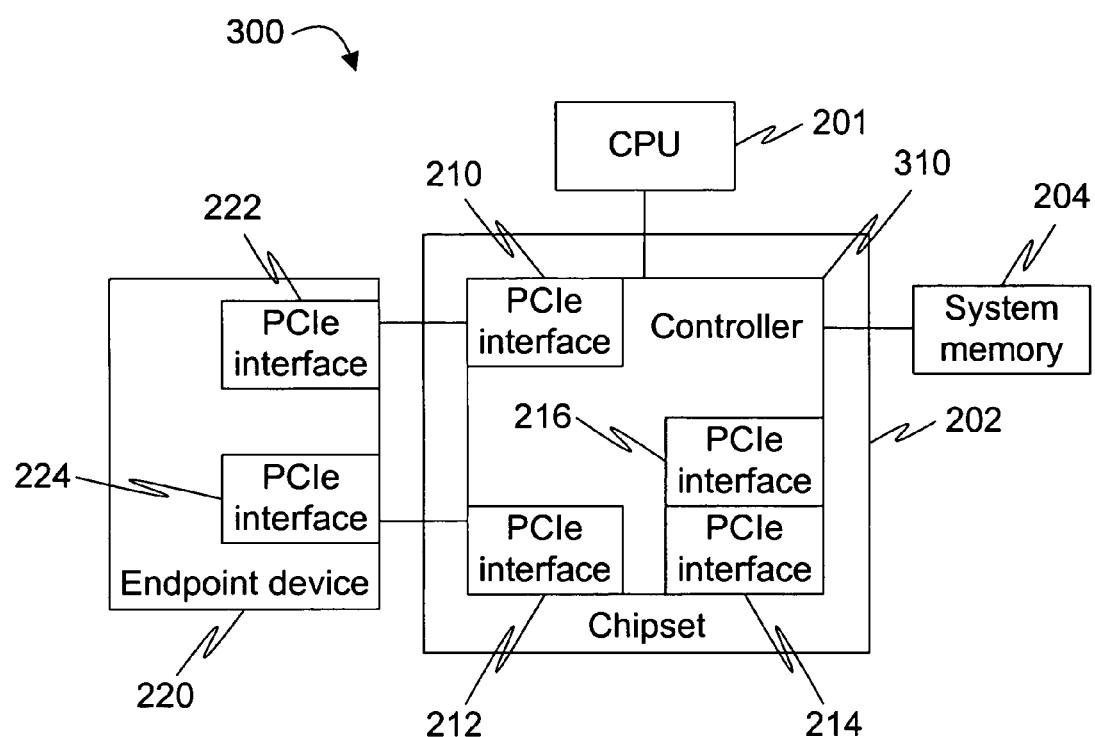
FIG. 3 is a simplified block diagram of a computer system according to another embodiment of the invention.

FIG. 3 is a simplified block diagram showing a computer system 300 that employs PCIe links, in accordance with another embodiment of the invention. In this embodiment of the invention, the functions of a system controller 206 and I/O controller 208 in the computer system 200 are integrated on a single controller, referred to herein as controller 310. All other elements are the same as in FIG. 2.

Figure 4:
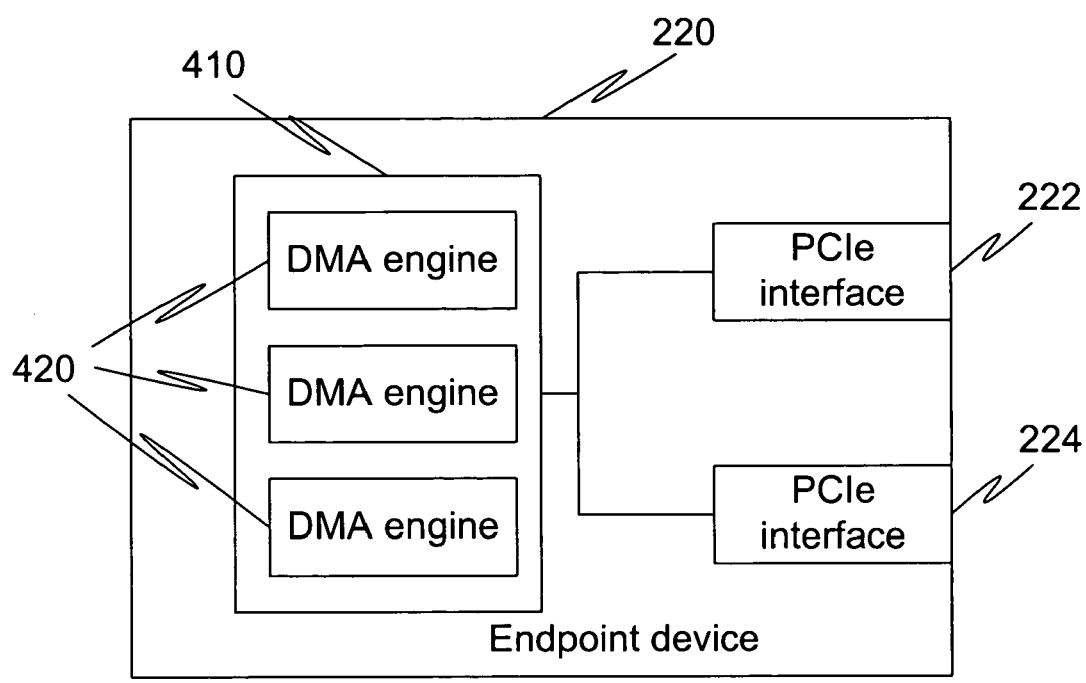
FIG. 4 is a block diagram showing various components of an endpoint device according to an embodiment of the invention.

FIG. 4 is a block diagram showing various components of the endpoint device 220 according to an embodiment of the invention. Endpoint device 220 includes PCIe interface 222, PCIe interface 224, and a core processing unit 410 that includes a plurality of direct memory access (DMA) processing engines 420. The core processing unit 410 synchronizes read completion PCIe packets received through PCIe interface 222 and PCIe interface 224. According to an embodiment of the invention, when read completion PCIe packets are received through PCIe interface 222 and PCIe interface 224 in response to a read request that was issued as a first read request PCIe packet communicated through PCIe interface 222 and a second read request PCIe packet communicated through PCIe interface 224, the received read completion PCIe packets are ordered by the core processing unit 410 in the same order in which the first and second read request PCIe packets were issued. According to another embodiment of the invention, the DMA processing engines are pre-assigned to one of the two PCIe interfaces, and a read request made by a DMA processing engine is issued as a read request PCIe packet communicated through the PCIe interface that was pre-assigned to that DMA processing engine.

Figure 5:
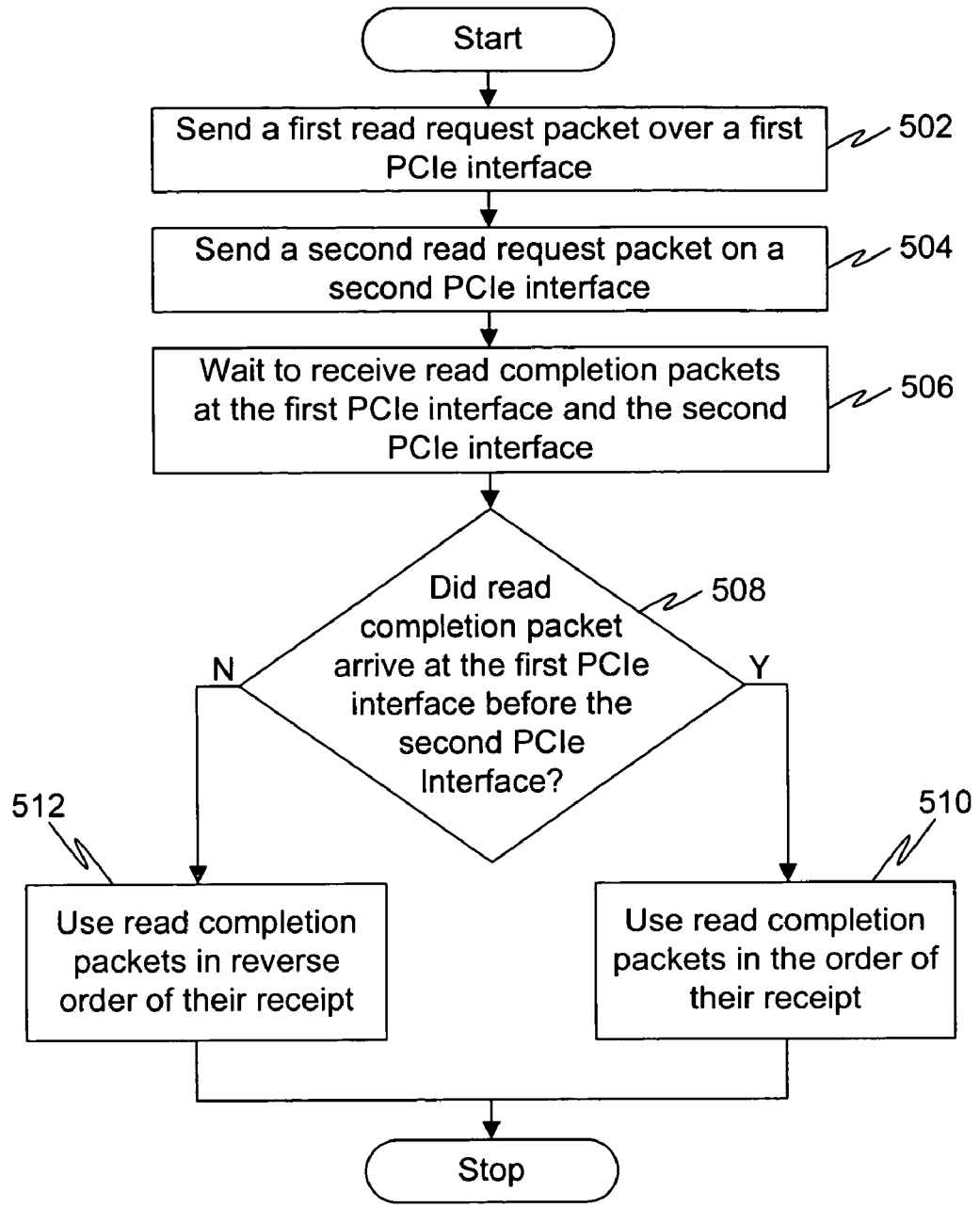
FIG. 5 is a flowchart of method steps for communicating between an endpoint device and a chipset in a computer system, in accordance with an embodiment of the invention.

FIG. 5 is a flowchart of method steps carried out by endpoint device 220 in connection with a read request that is issued as a first read request PCIe packet communicated through PCIe interface 222 and a second read request PCIe packet communicated through PCIe interface 224. At step 502, endpoint device 220 sends the first read request PCIe packet over PCIe interface 222. Then, at step 504, endpoint device 220 sends the second read request PCIe packet over PCIe interface 224. Endpoint device 220 then waits to receive the read completion PCIe packets through PCIe interface 222 and PCIe interface 224 (step 506). At step 508, a check is made to see if the read completion PCIe packet is received through PCIe interface 222 before the read completion PCIe packet is received through PCIe interface 224. If so, the read completion PCIe packets are used in the order of their receipt (step 510). If not, the read completion PCIe packets are used in the reverse order of their receipt (step 512).

Figure 6:
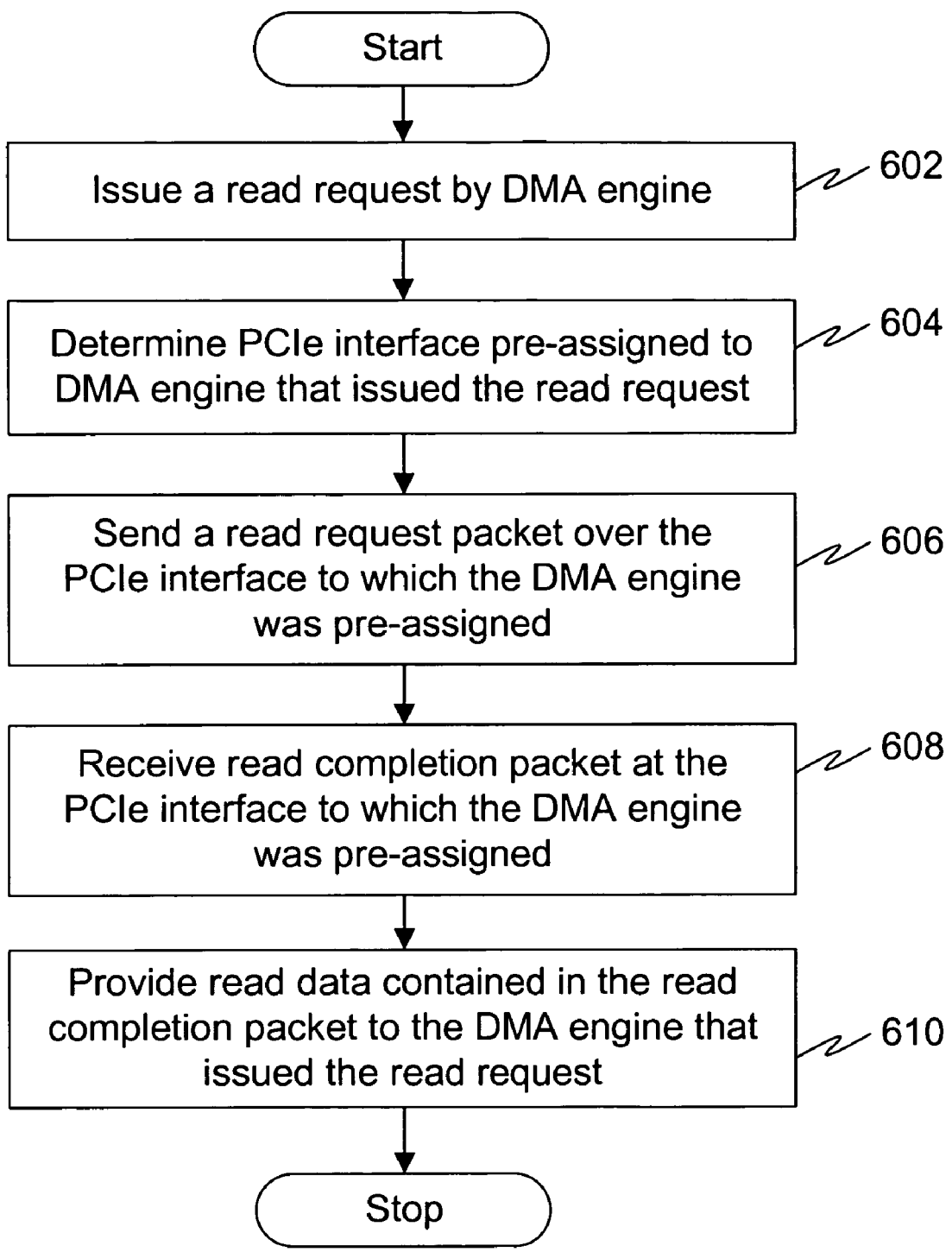
FIG. 6 is a flowchart of method steps for communicating between an endpoint device and a chipset in a computer system, in accordance with another embodiment of the invention.

FIG. 6 is a flowchart of method steps carried out by endpoint device 220 in the embodiment in which DMA processing engines are pre-assigned to one of the two PCIe interfaces. At step 602, a read request is issued by a DMA processing engine. Then, the PCIe interface that has been pre-assigned to the DMA processing engine that issued the read request is determined (step 604). At step 606, a read request PCIe packet is issued through the PCIe interface determined in step 604. Endpoint device 220 then receives the read completion PCIe packet through the PCIe interface determined in step 604 (step 608). When it does, the read data contained in the read completion PCIe packet are provided to the DMA processing engine that issued the read request (step 610).

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A computer system employing PCI Express (PCIe) links, the computer system comprising:
   a chipset, the chipset comprising at least first and second controllers; and
   at least one processing unit coupled to the chipset, wherein the at least one processing unit includes:
     a first PCIe interface,
     a second PCIe interface that is physically distinct from the first PCIe interface, and
     a core logic unit, comprising:
       a first direct memory access (DMA) engine coupled to the first controller through the first PCIe interface and configured to transmit a first read request to the first controller through the first PCIe interface, and
       a second DMA engine coupled to the second controller through the second PCIe interface and configured to transmit a second read request to the second controller through the second PCIe interface following the transmission of the first read request,
     wherein the core logic unit is configured to cause the processing unit to process a first read completion packet associated with the first read request before processing a second read completion packet associated with the second read request independently of the order with which the first read completion packet and the second read completion packet are received by the processing unit.

2. The computer system of claim 1, wherein the first controller comprises a PCIe interface that is coupled to the first PCIe interface of the at least one processing unit.

3. The computer system of claim 2, further comprising a system memory coupled to the first controller, wherein the at least one processing unit accesses the system memory through the first controller.

4. The computer system of claim 3, wherein the second controller comprises a PCIe interface that is coupled to the second PCIe interface of the at least one processing unit.

5. The computer system of claim 4, wherein the at least one processing unit accesses the system memory through the second controller.

6. The computer system of claim 5, wherein the second controller comprises a plurality of expansion PCIe interfaces, and the PCIe interface of the second controller that is coupled to the second PCIe interface of the at least one processing unit is one of the expansion PCIe interfaces.

7. The computer system of claim 1, wherein the chipset comprising the first and second controllers is implemented as a single controller.

8. A processing unit in a computer system that employs PCI Express (PCIe) links, the processing unit comprising:
  a first PCIe interface, the first PCIe interface being configured to be coupled to a first controller of the computer system;
  a second PCIe interface being physically distinct from the first PCIe interface, the second PCIe interface being configured to be coupled to a second controller of the computer system; and
  a core logic unit, comprising:
    a first direct memory access (DMA) engine coupled to the first controller through the first PCIe interface and configured to transmit a first read request to the first controller through the first PCIe interface, and
    a second DMA engine coupled to the second controller through the second PCIe interface and configured to transmit a second read request to the second controller through the second PCIe interface following the transmission of the first read request,
    wherein the core logic unit is configured to cause the processing unit to process a first read completion packet associated with the first read request before processing a second read completion packet associated with the second read request independently of the order with which the first read completion packet and the second read completion packet are received by the processing unit.

9. The processing unit of claim 8, wherein the first PCIe interface is configured to connect to 16 PCIe lanes and the second PCIe interface is configured to connect to less than 16 PCIe lanes.

10. The processing unit of claim 9, wherein the second PCIe interface is configured to connect to 4 PCIe lanes.

11. The processing unit of claim 8, wherein the first controller and the second controller are implemented as a single controller.

12. The processing unit of claim 8, wherein the processing unit is a graphics processing unit.

13. In a computer system having at least one processing unit and a chipset coupled to the at least one processing unit by first and second PCI Express (PCIe) links, the at least one processing unit has a first PCIe interface connected to the first PCIe link and a second PCIe interface connected to the second PCIe link, the first PCIe interface being physically distinct from the second PCIe interface, a method for communicating between the processing unit and the chipset comprising the steps of:
  transmitting a first read request over the first PCIe link through the first PCIe interface;
  transmitting a second read request over the second PCIe link through the second PCIe interface following transmission of the first read request;
  receiving a first read completion packet associated with the first read request;
  receiving a second read completion packet associated with the second read request; and
  processing the first read completion packet before processing the second read completion packet independently of the order with which the first read completion packet and the second read completion packet are received by the processing unit.

14. The method of claim 13, wherein the at least one processing unit further comprises a first direct memory access (DMA) engine configured to transmit the first read request over the first PCIe link and a second DMA engine configured to transmit the second read request over the second PCIe link.

15. The method of claim 13, wherein the step of processing the first read completion packet before processing the second read completion packet comprises re-ordering the first read completion packet and the second read completion packet if the first read request is issued before the second read request, and the first read completion packet is received after the second read completion packet.

16. The method of claim 13, wherein computer system further includes a system memory, and wherein the chipset is configured to access the system memory in response to the first and second read requests received over the first and second PCIe links.

17. The method of claim 16, wherein the chipset includes a first controller that is configured to access the system memory and a second controller coupled to the first controller, and wherein the first controller accesses the system memory in response to the first read request received over the first PCIe link and in response to the second read request received from the second controller.

18. The method of claim 17, wherein the first controller returns the first read completion packet in response to the first read request over the first PCIe link and the second read completion packet in response to the second read request to the second controller over the second PCIe link.

19. The computer system of claim 1, wherein the processing unit comprises a graphics processing unit.

20. The method of claim 13, wherein the processing unit comprises a graphics processing unit.

* * * * *